UNITED STATES PATENT OFFICE.

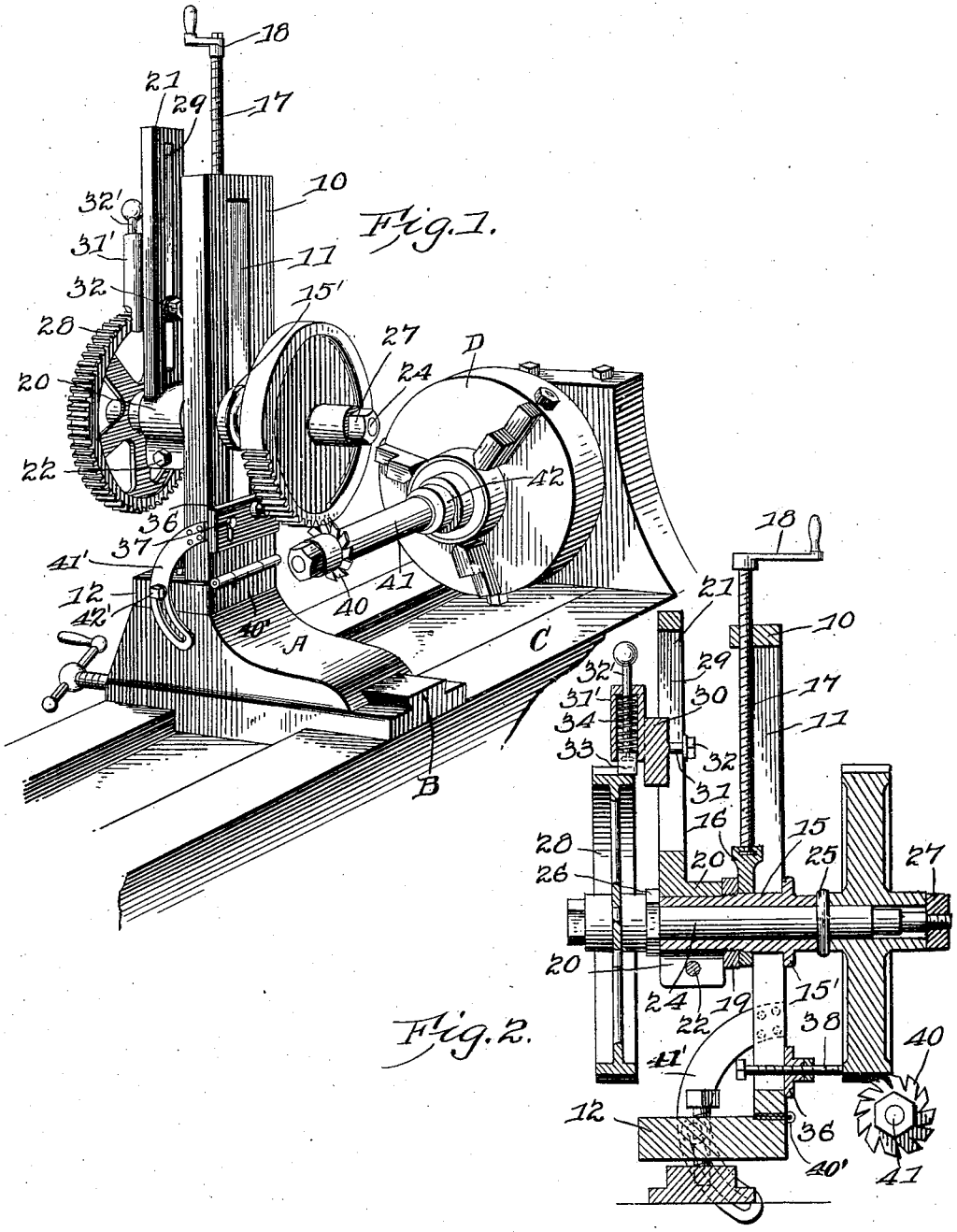

GARRET D. MARVIN, OF FINDLAY, OHIO.

GEAR-CUTTER.

No. 869,319.　　　　Specification of Letters Patent.　　　　Patented Oct. 29, 1907.

Application filed December 30, 1905. Serial No. 293,960.

*To all whom it may concern:*

Be it known that I, GARRET D. MARVIN, a citizen of the United States, residing at Findlay, in the county of Hancock and State of Ohio, have invented a new and useful Gear-Cutter, of which the following is a specification.

This invention relates to gear cutting machines, and has for its principal object to provide a device which may be employed as an attachment for lathes in the cutting of gears of any type.

A further object of the invention is to provide a gear cutting mechanism of very simple and inexpensive construction, and which may be handled with ease and connected to and disconnected from a lathe or similar mechanism by a single operator.

A still further object of the invention is to provide a gear cutting device in which gears of any size may be cut, and in which a pattern wheel is employed for the purpose of effecting fresh adjustments of the blank as tooth after tooth is cut, the pattern wheel being locked after each adjustment, and serving to hold the blank in proper position with respect to the cutter tool.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a perspective view of a gear cutting machine constructed in accordance with the invention. Fig. 2 is a vertical section of the same.

Similar numerals of reference are employed to indicate corresponding parts throughout the several figures of the drawings.

The main frame of the device is in the form of a vertically disposed bar 10 that is provided with a vertical slot 11, extending practically from end to end thereof, and at the base of the bar is a laterally extended foot piece 12 which may be secured to a carrier in any suitable manner, and in Fig. 1 is shown as secured to the transversely movable carriage A of an ordinary form of lathe, the carriage A being supported as usual on the longitudinally adjustable carriage B, these parts of the mechanism, as well as the lathe bed C and head stock D being of any ordinary construction.

Arranged in the vertical slot 11 is a rectangular block 15, having an enlarged flange 15', that fits against the outer face of the bar 10. This block is supported by a ring 16, the top of which has a swiveled connection with a screw 17 that extends through a threaded opening at the top of the bar 10 and carries a crank 18 by which the screw may be turned for the purpose of raising and lowering the block 15. That portion of the block beyond the ring 16 is circular in form, and is threaded for the reception of a nut 19, which, by forcing the ring against the outer or rear face of the bar 10, prevents any lateral play of the block 15.

The outer end of the block 15 is cylindrical in form and receives the split hub 20, of an arm 21; said hub being firmly locked in place by a clamping screw or bolt 22, so that the arm is held from further revoluble or longitudinal movement.

The block 15 is provided with an opening for the passage of a shaft 24, provided near one end with a fixed flange or collar 25 that bears against the outer end of the block, and near its opposite end is threaded for the reception of a nut 26, which, in screwing against the end of the block 15, serves to hold said shaft from any independent longitudinal movement. The inner end of the shaft 24 is stepped, that is to say, is provided with portions of successively smaller diameter that may receive hub bores of different diameter. This permits of the reception of wheel blanks having bores of different diameter, and the blanks when once adjusted to position are firmly locked in place by a nut 27.

The outer end of the shaft is arranged to receive a pattern wheel 28 having teeth of a number equal to the number of teeth to be cut in the blank, although it is not necessary that the pattern wheel should be of the same diameter as the blank.

The arm 21 hereinbefore referred to, is provided with a vertical slot 29. which receives the vertically adjustable block 30, from which projects a threaded stem 31 carrying a nut 32 by which the block may be locked in any position of adjustment.

The block carries a cylindrical casing 31', through which extends a locking pin 32' having at its lower end a tooth 33 arranged to engage between the teeth of the pattern wheel, and the tooth is held in position by means of a spring 34 surrounding the pin 32'. The upper end of the pin is provided with an enlarged knob or head by which it may be readily raised for the purpose of turning the pattern wheel, this movement being transmitted to the wheel blank at the opposite end of the shaft.

Near the lower portion of the bar 10 is a vertically adjustable plate 36 which may be locked in any position of adjustment by bolts 37. This plate carries a screw 38 disposed parallel with the shaft 24 and capable of adjustment in order that it may form a backing for the wheel blank during the cutting operation, the screw serving to engage the rim portion of the wheel at a point adjacent to the line of cut, and holding the wheel rim in order to prevent breakage or chattering of the tool.

The cutting tool 40 is of any ordinary construction, and, in the present instance, is carried by a spindle 41 having an enlarged head 42 which may be secured to the head stock D of the lathe.

In operation, the parts are adjusted in the manner shown in Figs. 1 and 2, and the operator then moves the transverse carriage A of the lathe in order to carry the frame 10 in the direction of the cutting tool. This moves the periphery of the blank across the cutting tool and makes the first cut, after which the carriage is drawn out and the screw 17 is carried down for the second adjustment, and so on until the cut has reached the desired depth, or the cutting may take place so that successive cuts are formed at successive points, and in this case no adjustment of the screw will be necessary until the new blank has made one complete revolution, and all of the teeth are partly cut.

It will be observed that the adjustment from tooth to tooth may be quickly accomplished by merely pulling the pin 32 outward and turning the pattern wheel the desired distance.

The frame 10 as a whole is preferably pivoted, so that it may be adjusted to present the blank at any angle to the horizontal, and thus permit the cutting of a miter or bevel gear.

In order to cut a toothed wheel having a transversely concaved periphery, the blank is not moved transversely across the lathe, but remains with the center of the blank in the vertical plane of the axis of the cutter, so that the periphery of the blank will be concaved transversely as is usual in worm gears.

The vertical bar 10 is connected to the base piece 12 by a pivot 40', so that the angular position of the bar may be changed when the teeth of a bevel gear are to be cut. In order to lock the bar in adjusted position, said bar is provided with an arcuate strip 41', having a slot for the reception of a bolt 42' that extends into the foot piece 12, there being preferably a locking strip at each side of the bar.

I claim:—

1. The combination of a frame, a bearing block adjustably mounted thereon, a shaft in the block, a slotted arm adjustably secured to the block, a pattern wheel on the shaft adjacent the arm, a slidably adjustable member on the arm, a device on the member arranged to engage the periphery of the pattern wheel, and a spring arranged to hold the device in engagement with the wheel.

2. The combination of a frame, a bearing block adjustably mounted thereon, a shaft in the block, an arm adjustably attached to the block, a chambered block adjustable longitudinally of the arm, a pin in the chamber of the block and extending at one end thereof to form a hand-hold, and a yielding means within the chamber of the block for operating on the pin.

In testimony that I claim the foregoing as my own, I have hereto affixed my signature in the presence of two witnesses.

GARRET D. MARVIN.

Witnesses:
MARION G. FOSTER.
HARVEY C. MIELEY.